3,155,582
ANTIBIOTIC M-319
Thomas Josephus Oliver, Zion, and Arthur Charles Sinclair, Lake Bluff, Ill., assignors to Abbott Laboratories, North Chicago, Ill., a corporation of Illinois
Filed Mar. 5, 1962, Ser. No. 177,289
6 Claims. (Cl. 167—65)

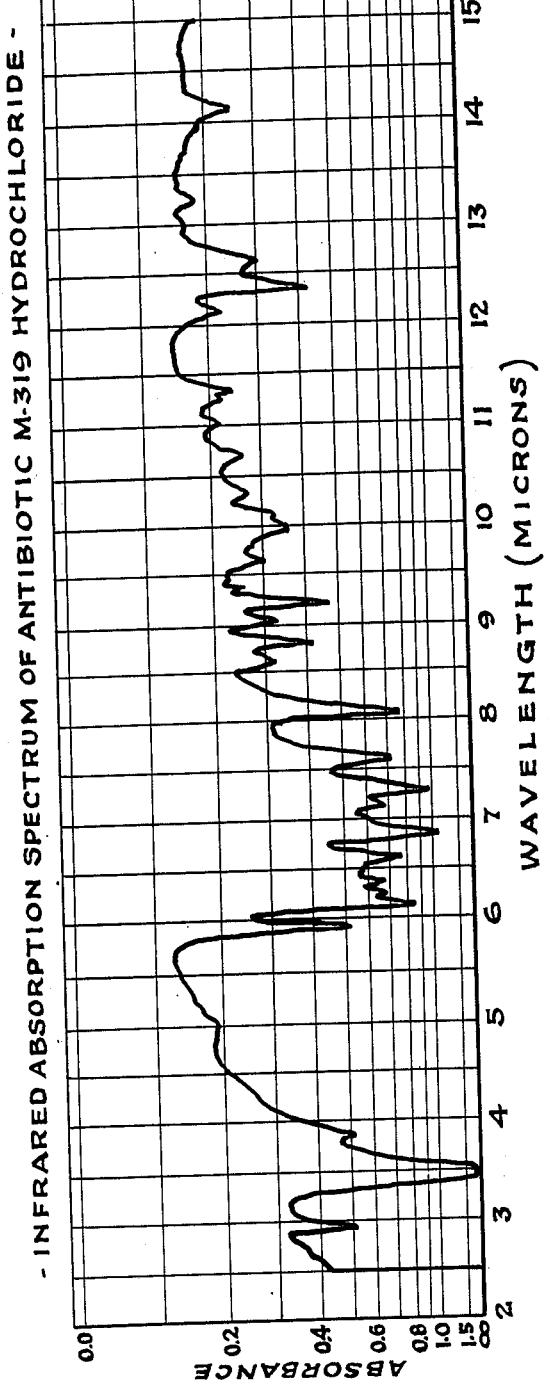

This invention relates to novel compounds possessing antimicrobial properties and to a process for their preparation. More particularly, the invention relates to a new composition of matter referred to herein as antibiotic M-319, to a process for its production by fermentation, to a method for its recovery and concentration from crude solutions including the fermentation broths, to its purification and to certain salts and production thereof.

It is the principal object of the invention to provide a new and useful antibiotic which is active against a variety of microbes such as Staphylococcus aureus, Escherichia coli and Proteus vulgaris as well as causative agent of turkey sinusitis. Another object of this invention is to provide various salts of antibiotic M-319 such as the hydrochloride, calcium salt and calcium chloride complex. A further object is to provide a process for the production and recovery of antibiotic M-319 in its free acid form. Other objects and features of the invention will become manifest upon reading the specification and appended claims.

We have found that by cultivating under controlled conditions and on suitable culture media a heretofore undescribed species of Nocardia, a novel composition of matter herein identified as antibiotic M-319 is obtained. The microorganism was isolated from a soil sample collected in Springfield, Massachusetts. The morphological features and particularly the micromorphology of this organism in the description which follows are characteristic of the genus Nocardia. A survey of the literature, especially those species of Nocardia producing yellow growth on both synthetic and complex organic media, failed to reveal known species of Nocardia which satisfactorily agreed with the characteristics hereinafter set forth. The organism of the present invention is accordingly deemed to be a new species and has been assigned the name Nocardia sulphurea. The specific epithet which is Latin for "of the color of sulfur" refers to the greenish-yellow color of the substratal mycelium and soluble pigment at the height of growth in a number of media. A culture of the living organism has been deposited and is available at the Culture Collection Unit of the Northern Utilization Research and Development Division, United States Department of Agriculture, Peoria, Illinois, under the Code NRRL 2822.

TAXONOMY OF *NOCARDIA SULPHUREA*, SP. NOVO

With the exception of determining cultural characteristics and proteolytic activity in gelatin which was done at 24° C., all cultural characteristics in the standard media listed below were obtained by incubation at 28° C.

The color code references, such as 3 na, are those from the Color Harmony Manual, Third Edition, Jacobsen, R.; Granville, W. C.; and Foss, C. E.; 1948; Container Corporation of America. The color names used are those designated in The ISCC-NBS Method of Designation Colors and a Dictionary of Color Names, U.S. Department of Commerce, National Bureau of Standards, Circular 553, issued November 1, 1955. As an example, the color of the removable plastic color chip coded 3 na in the Color Harmony Manual is named strong orange yellow on page 49 of the NBS Circular 553. In the following text of cultural characteristics, color names from the National Bureau of Standards Circular No. 553 are capitalized followed by the corresponding code of matching color chip from the Color Harmony Manual in parentheses. Other color observations are not capitalized.

WAKSMAN'S AGAR

Growth is rapid and abundant. Aerial mycelium scant on a few colonies and in confluent growth streak at two days is abundant at four days. The confluent growth streak, faintly wrinkled by day four, becomes progressively wrinkled and by day twenty-one is scally and in ruptured spots reveals the darker substratal growth. Well isolated colonies reaching 2.0 mm. diameter by day twenty-one are umbonate. Some scaling and rupturing is noted in isolated colonies also. The aerial White or Light Gray (b) at four days becomes final color Pale Yellow (1½ ca) by eight days. The substratal (reverse) color is Moderate Yellow (2 hb) at four days, Strong Orange Yellow (3 na) at eight days, Strong Yellowish Brown (3 pg) at eleven days and Moderate Brown (4 ni) at twenty-one days. A slight yellow soluble pigment at eight days becomes abundant Strong Yellow (2 lc) by day eleven.

NUTRIENT AGAR

Growth is good. Aerial mycelium fully covering growth including isolated colonies by day four is White or Light Gray (b) through day fourteen becoming Pale Yellow (2 ca) on day twenty-one. Well isolated colonies reach a maximum of 1.0 diameter. Substratal color is Light Yellow (2 ea) at four days, Grayish Greenish Yellow (1½ gc) eight days, progressing to Moderate Yellowish Brown (3 pe) at twenty-one days. A faint yellow green soluble pigment appearing at eight days was not noted thereafter.

GLUCOSE AGAR

Growth characteristics closely paralleled those on Waksman's agar. For example, at eleven days substratal color was Strong Yellowish Brown (3 pg) and soluble pigment a Moderate Yellow (1½ lc). Scaling and rupturing of the surface of growth occurred also on this medium.

DEXTROSE, ASPARAGINE AGAR

Growth is moderately rapid although well isolated colonies do not exceed 0.5 mm. diameter after twenty-one days. Aerial mycelim abundant at eight days is Yellowish White (1 ba) becoming Pale Yellow Green (1 ca) at eleven days. Substratal growth colorless and translucent at four days becomes Light Greenish Yellow (1 ea) at eight days, Brilliant Greenish Yellow (1 ia) eleven days and Dark Yellow (2 ne) at twenty-one days. Soluble pigment at eleven days is Vivid Yellow (1½ la) and Strong Yellow (2 nc) at twenty-one days. Shallow cracks appear in the surface of confluent growth at twenty-one days.

CALCIUM MALATE AGAR

Growth is good. Digestion of malate noted first five days and proceeds to 1.0 cm. from confluent growth streak by day twenty-six. At sixteen days the abundant aerial is Yellowish Gray (2 dc), substratal color is Dark Yellow (2 ne) to Gray Yellowish Brown (3 li) and a very slight smoky appearance is noted in the cleared areas adjacent to heavy growth. Well isolated colonies are 1.0 mm. in diameter.

L-TYROSINE AGAR (SYNTHETIC)

Growth is good. At sixteen days the abundant is Pale Yellow Green (1 ca) and soluble pigment is Light Greenish Yellow (1 ga). No further change is noted at twenty-six days. Melanoid pigment is absent.

YEAST EXTRACT, MALT EXTRACT AGAR

Growth is abundant. Aerial at fourteen days is Pale Yellow Green (1 cb) changing to Grayish Greenish Yellow (1½ gc) by day twenty-eight. Substratal mycelium of confluent growth streak at fourteen days is near Light Olive (1½ pi) becoming dark olive (1½ pn) day twenty-eight. Substratum of isolated colonies Dark Yellow (2 le) fourteen days and Dark Yellow (2 ne) twenty-eight days. A greenish yellow soluble pigment develops by day seven.

PHYSIOLOGIC OBSERVATIONS

| | |
|---|---|
| Blood agar | Moderate hemolysis. |
| L-tyrosine agar | Tyrosine negative. |
| Soluble starch | No hydrolysis. |
| Litmus milk | Coagulated, slowly peptonized. |
| Gelatin (plain) | Moderately rapid liquefaction. |
| Nitrate agar | Test for nitrite markedly positive. |

MICROMORPHOLOGY

Microscopic observations from a number of synthetic and organic media revealed no true spore chains. The aerial mycelium is sparsely branched and fragments completely into bacillary to coccoid elements. Observations from tomato paste oatmeal agar at seven days showed a bacillary fragmentation of the aerial mycelium from about 1.0 micron in diameter to 2.0 to 5.0 microns in length. At twenty-nine days on yeast extract malt extract agar coccoid elements approximately 0.7 micron by 1.0 micron predominated over a relatively few longer bacillary forms. Similar observations were made from growth on the basal medium of Pridham and Gottlieb with dextrose and with maltose as carbon sources and from Czapek's solution with soluble starch agar. Electron microscopy confirmed the bacillary fragmentation of the mycelium. The elements have smooth walls and blunt ends.

*Utilization of Carbon Sources by* Nocardia sulphurea

[In the basal medium of Pridham and Gottlieb, J. Bact., volume 56: 107–114]

| Source | Utilization | Growth |
|---|---|---|
| Pentoses: | | |
|   Xylose | − | |
|   Arabinose | + | Very slow. |
|   Rhamnose | − | |
| Hexoses: | | |
|   Dextrose | + | Rapid. |
|   Galactose | + | Do. |
|   Mannose | + | Do. |
| Ketoses: | | |
|   Fructose | + | Do. |
|   Sorbose | − | |
| Disaccharides: | | |
|   Sucrose | + | Slow. |
|   Lactose | − | |
|   Maltose | + | Rapid. |
|   Cellobiose | − | |
| Trisaccharide: Raffinose | − | |
| Polysaccharides: | | |
|   Soluble Starch | + | Slow. |
|   Cellulose | − | |
| Glucoside: Salicin | + | Very slow. |
| Alcohols: | | |
|   Glycerol | + | Rapid. |
|   Mannitol | + | Do. |
|   Dulcitol | − | |
|   Inositol | + | Slow. |
|   Sorbitol | + | Do. |
| Acids: | | |
|   Sodium citrate | + | Rapid. |
|   Sodium lactate | + | Slow. |
|   Sodium succinate | + | Rapid. |
|   Sodium acetate | + | Do. |
|   Sodium Potassium Tartrate | + | Do. |
| Hydrocarbon: Paraffin | + | Moderate. |
| Control: No added carbon source | − | |

As previously stated, the present invention also embraces a process for growing Nocardia sulphurea under controlled conditions which include a temperature of 24°–30° C. and preferably a temperature of 28° C., submerged fermentation with suitable agitation and aeration using media consisting of a carbon source such as glucose, glycerol, molasses or combination of these; a source of organic nitrogen such as soybean meal or peptone; a source of growth substances, and minerals such as distillers' solubles and sodium chloride; an insoluble buffering agent to prevent the accumulation of acid such as calcium carbonate and a non-toxic, defoaming agent such as soybean oil plus methylpolysiloxane antifoam. When the growth of the organism has produced a satisfactory amount of antibiotic M-319 as indicated by assay with the *Proteus vulgaris* zone of inhibition method or by the ultraviolet absorption method, the culture is filtered and the antibiotic recovered from the filtrate preferably by the use of an ion exchange resin. The antibiotic can be obtained as a free acid in either amorphous or crystalline form or as a hydrochloride, calcium salt or calcium chloride complex by the procedures more fully described and illustrated in the examples which follow. A specific substance thus obtained possesses unique and valuable properties and has characteristics which distinguish it from known and previously described antimicrobial substances.

EXAMPLE 1

*Production in Shaken Flasks With a Peptone-Glucose-Molasses Medium*

To a 500 ml. Erlenmeyer flask is added 150 ml. of a seed medium containing the following in the concentrations given.

| | Grams per liter |
|---|---|
| Glucose | 15 |
| Extracted soybean flour | 15 |
| Sodium chloride | 5 |
| Calcium carbonate | 1 |

The flask and its contents are sterilized by autoclaving for 30 minutes at a temperature of 121° C. After cooling, the flask is inoculated with *Nocardia sulphurea*, strain M-319. The organism is grown on an agar slant of yeast extract-tryptone-glucose agar for three to five days at 28° C. A sterile, wide tipped, agar pipette is used to transfer a plug of the slant containing mycelium and agar into the Erlenmeyer flask prepared as just described.

The inoculated flask is incubated for 72 hours at 28° C. on a rotary shaker operating at about 240 r.p.m. and having a stroke of 2¼ inches. A second passage of the seed culture is prepared by using the above culture to inoculate additional flasks prepared and sterilized as above. The inoculation is accomplished with 9 ml. of the growth from the first seed flask. The second seed flasks are incubated for 72 hours under identical conditions.

Into each of eighty 500 ml. Erlenmeyer flasks is put 150 ml. of the following medium.

| | Grams per liter |
|---|---|
| Peptone | 5 |
| Molasses | 20 |
| Glucose | 10 |

The flasks are sterilized at 121° C. for 30 minutes. After cooling, each flask is inoculated with 5 ml. of second passage seed as described above. The inoculated flasks are incubated at 28° C. on the rotary shaker for six days, after which time the presence of substantial antibiotic activity is demonstrated by an inhibition zone against *Proteus vulgaris* of 23 mm. Under the same conditions, a 40 mcg./ml. solution of chloramphenicol gives a zone of 25 mm.

EXAMPLE 2

*Production in Shaken Flasks With a Peptone-Glucose-Molasses and Calcium Carbonate Medium*

Into each of forty 500 ml. Erlenmeyer flasks is put 150 ml. of the following medium.

| | Grams per liter |
|---|---|
| Peptone | 5 |
| Molasses | 20 |
| Glucose | 10 |
| Calcium carbonate | 2 |

The flasks are sterilized in the autoclave at 121° C. for 30 minutes. After cooling, the flasks are each inoculated with three ml. of the second passage seed prepared as described in Example 1. The flasks are incubated on the rotary shaker under conditions identical to those of Example 1. After six days' incubation, the supernatant from the culture following centrifugation gives 72 mcg./ ml. by the M–319 biological assay. Examination of the culture supernatant by paper chromatography reveals that the desired material is produced.

EXAMPLE 3

*Production in 200 Liter Fermentors With a Soybean Meal, Glucose, Sodium Chloride and Soybean Oil Medium*

The organism, *Nocardia sulphurea*, strain M–319, is grown on yeast extract-tryptone-glucose agar slants for five days at 28° C. The growth from an agar slant is suspended in a few ml. of sterile water and two 500 ml. Erlenmeyer flasks containing 125 ml. each of the following seed medium are inoculated.

|  | Grams per liter |
|---|---|
| Glucose monohydrate | 15 |
| Soybean meal | 15 |
| Sodium chloride | 5 |
| Calcium carbonate | 1 |

The flasks containing 125 ml. of this medium are sterilized by autoclaving for a period of 25 to 30 minutes at 120° C. After cooling, the flasks are inoculated with the growth from the agar cultures as previously described. The inoculated flasks are agitated at 28° C. for 72 hours on a rotary shaker having an eccentric of two and one-quarter inches. The entire contents of two flasks are aseptically transferred into a metal aerated bottle of approximately twelve-liter capacity containing ten liters of the following medium.

|  | Grams per liter |
|---|---|
| Soybean meal | 15 |
| Glucose monohydrate | 15 |
| Sodium chloride | 5 |
| Calcium carbonate | 1 |
| Polypropylene glycol antifoam | 1 |

The vessel and its contents were previously sterilized for 80 minutes at 120° C. and cooled to 28° C.

The aerated bottle is incubated at 28° C. for 72 hours. Air is bubbled through the culture medium from a tube at the bottom of the bottle at the rate of approximately 10 liters per minute. The entire contents of the bottle is then used to inoculate a fermentor of 200 liters capacity containing 115 liters of the following medium which has been previously sterilized at 122° C. for 45 minutes and cooled to 28° C.

|  | Grams per liter |
|---|---|
| Soybean meal | 30 |
| Glucose monohydrate | 50 |
| Sodium chloride | 5 |
| Calcium carbonate | 5 |
| Soybean oil | 5 |
| Methylpolysiloxane antifoam | 1 |

The inoculated medium in the fermentor is maintained under vigorous agitation at a temperature of 28° C. for 164 hours. Sterile air for the purpose of aerating the medium is introduced at the rate of 125 liters of air per minute. The agitator which stirs the medium in the fermentor is operated at 300 revolutions per minute.

The harvested culture gives a pH of 6.9 and assays 100 mcg. per ml. by the biological assay procedure using *Proteus vulgaris* as the test organism.

EXAMPLE 4

*Production in 2000 Liter Fermentors With a Peptone, Corn Steep Liquor, Glucose and Soybean Oil Medium*

Inoculum for three seed fermentors is prepared by the use of three metal aerated vessels as described in Example 3. The entire contents of one of the metal vessels is used to inoculate each of three seed fermentors of 200 liter capacity containing 115 liters of the following medium which is sterilized at 122° C. for 45 minutes and cooled to 28° C.

|  | Grams per liter |
|---|---|
| Soybean meal | 30 |
| Glucose monohydrate | 50 |
| Calcium carbonate | 5 |
| Soybean oil | 5 |
| Polypropylene glycol antifoam | 1 |

The seed fermentors are held at 28° C. for 68 hours with vigorous mechanical agitation and aeration. Sterile air is introduced at the rate of 125 liters per minute. The agitator which stirs the medium in the fermentor is operated at 350 revolutions per minute.

Each of three fermentors of 2000 liter capacity is charged with 1200 liters of the following medium and is inoculated with sixty liters of whole culture from a seed fermentor.

|  | Grams per liter |
|---|---|
| Peptone | 20 |
| Corn steep liquor | 5 |
| Glucose monohydrate | 25 |
| Calcium carbonate | 2 |
| Soybean oil | 5 |
| Polypropylene glycol antifoam | 1 |

The medium for the 2000 liter fermentors is sterilized in the continuous sterilizing equipment by heating to 155° C. for three seconds and then rapidly cooling. The inoculated fermentors are operated at 28° C. for 236 hours. Sterile air is introduced into the medium at a rate of 600 liters per minute. The three 2000 liter fermentors which differ in the amount of agitation give the following assays at harvest.

| Fermentor | Agitation (r.p.m.) | pH | Assay, mcg./ml. |
|---|---|---|---|
| A | 186 | 7.4 | 610 |
| B | 275 | 7.3 | 716 |
| C | 324 | 7.6 | 580 |

EXAMPLE 5

*Production in 40,000 Liter Fermentors*

Inoculum for a seed fermentor is prepared by the use of a metal aerated vessel as described in Example 3. The entire contents of one metal vessel is used to inoculate a seed fermentor of 3500-liter capacity containing 1600 liters of the following medium which is sterilized at 122° C. for 45 minutes and cooled to 28° C.

|  | Grams per liter |
|---|---|
| Soybean oil | 5 |
| Glucose monohydrate | 20 |
| Corn steep liquor | 5 |
| Peptone | 20 |
| Calcium carbonate | 5 |
| Polypropylene glycol antifoam | 1 |

The seed fermentor is held at 28° C. for 68 hours with vigorous mechanical agitation and aeration.

The fermentor of 40,000 liter capacity containing 28,000 liters of the following medium is inoculated with 1600 liters of whole culture from the seed fermentor.

|  | Grams per liter |
|---|---|
| Soybean oil | 5 |
| Glucose monohydrate | 25 |
| Corn steep liquor | 5 |
| Peptone | 20 |
| Calcium carbonate | 2 |
| Polypropylene glycol antifoam | 1 |

The medium for the 40,000 liter fermentor is sterilized in the continuous sterilizing equipment by heating to 155°

C. for two minutes and twenty-four seconds and then cooling rapidly. The inoculated fermentor is operated at 28° C. for 260 hours. Sterile air is introduced into the medium at a rate of 20,000 liters per minute. The agitator of the fermentor turns at 40 r.p.m. The assay of the whole culture at harvest is 570 mcg./ml.

EXAMPLE 6

*Recovery of Crude M–319 From Shake Flask Beer*

The beer produced in Example 1 (4.5 liters) is adjusted to pH 2 with hydrochloric acid and filtered. The filtrate (4 liters) is adjusted to pH 6.6 and passed over a column packed with 2 liters of a synthetic magnesium silicate adsorbent (sold under the trade name of Florisil). The column is washed with 4 liters of water and two liters of acetone. Development and elution is conducted with slightly acidified methanol. Fractions are collected and tested for antibacterial activity by means of inhibition zone assays against *Staphylococcus aureus* and *Proteus vulgaris*. Most of the antibacterial activity occurs in a 375 ml. volume of eluate collected after about 1600 ml. of the acidified methanol has gone through the column. The fractions containing the antibacterial activity are combined and evaporated to a residue. The residue is extracted with 300 ml. of butanol to dissolve out the antibacterial substance. The butanol solution is washed with water, evaporated to 15 ml. and diluted with 180 ml. of diethyl ether. The antibacterial activity remains in solution while an inactive precipitate forms and is removed. The supernatant is evaporated to a residue which weighs 200 mg. and contains 50% of the antibacterial activity of the original beer. When dissolved in 0.1 M potassium dihydrogen phosphate solution, the material exhibits ultraviolet absorption maxima at 221 and 272 millimicrons of intensity $$E_{1\ cm.}^{1\%} = 110 \text{ and } 124 \text{ respectively}$$

It inhibits *Proteus vulgaris* at 32 mcg./ml. in a tube dilution test and protects mice from Proteus infection.

EXAMPLE 7

*Recovery of Antibiotic M–319 From Shaken Flask Fermentation Using a Cationic Resin*

A portion of the culture grown as described in Example 2 is adjusted to pH 1.5 with hydrochloric acid. The culture is extracted for thirty minutes with one-fourth volume of n-butanol. The butanol phase is separated by centrifugation and the aqueous layer is extracted a second time with one-sixth volume of butanol. The combined butanol extracts are washed with water and two volumes of pentane are added. The solvent mixture is adjusted to pH 10.5 with sodium hydroxide and extracted several times with deionized water. The aqueous extracts are combined and adjusted to pH 8.0.

A sulfonated polystyrene-divinylbenzene copolymer ion exchange resin such as Dowex 50×4 is regenerated to the cationic form by using a five percent hydrochloric acid wash. The resin is washed with distilled water to remove the excess acid. The resin is then washed with small portions of dilute alkali until the pH of the resin effluent is 7.0. Sufficient resin, one gram for each 2,500 mcg. of antibiotic activity is placed on a column to give a bed 195 centimeters in depth.

One-tenth percent aqueous sodium sulfite solution is added to the aqueous extract of antibiotic M–319 and the pH adjusted to 7.5. The solution is passed through the resin column at a flow rate of 2 ml. per minute. The column is washed thoroughly with a one-tenth percent aqueous solution of sodium sulfite. The column is eluted with a one-tenth percent solution of sodium bisulfite which has been previously adjusted to pH 10 with ammonium hydroxide. The eluate contains 69 percent of the activity placed over the column. The eluate is adjusted to pH 1.5 with hydrochloric acid and extracted with one-fourth volume of butanol. A second extraction is carried out with one-sixth volume of butanol. The combined butanol extracts are washed with water. Two volumes of pentane are added and the mixture adjusted to pH 11.0. The solvent mixture is extracted several times with water. The aqueous extract is adjusted to pH 8.0. This extract is found to contain approximately thirty-six percent of the antibiotic present in the original culture. The potency of the material is 81 mcg. per mg.

EXAMPLE 8

*Recovery of Antibiotic M–319 as Crude Calcium Salt*

Fifty-three liters of whole culture produced as described in Example 3 is adjusted to pH 1.6 with twenty percent sulfuric acid and mixed with 15 liters of n-butyl alcohol. The solvent and culture are agitated for twenty minutes. The solvent and aqueous phases are separated by centrifugation. The aqueous phase is extracted a second time with four liters of n-butanol. The solvent is separated by centrifugation and combined with the butanol from the first extraction to make sixteen and one-half liters. The butanol extract is washed twice with one liter portions of deionized water. Two volumes of mixed pentanes (Skellysolve A) and 930 ml. of deionized water are added. The pH of this mixture is adjusted to 10.3 with ten percent aqueous sodium hydroxide solution. After the mixture is stirred gently for fifteen minutes, the aqueous phase is separated. Two additional extractions are made in the same manner with deionized water. The total volume of the combined aqueous extracts is 2400 ml. The extract is adjusted to pH 7.5 with ten percent aqueous hydrochloric acid solution. Sodium bisulfite and calcium chloride are added at concentrations of ten grams per liter and the solution stirred for thirty minutes. The pH is adjusted to 4.6 with four percent aqueous hydrochloric acid solution. The temperature is approximately 25° C. at this point. The acidified extract is placed in the cold room overnight at 4° C. The solids are separated by filtration and washed with cold, deionized water. A total of 10.6 grams of antibiotic M–319 calcium salt is recovered which assay 134 mcg. per mg.

EXAMPLE 9

*Recovery of Antibiotic M–319 as Calcium Salt*

Sixteen hundred liters of whole culture produced as described in Example 4 is adjusted to pH 3.9 with concentrated sulfuric acid. Two percent by weight of a filter aid is added together with two kilograms of activated carbon (Nuchar C–190–N). The mixture is stirred for thirty minutes, then filtered with a plate and frame filter press. The filtrate which assays about 9 mcg. per ml. is discarded. The filter cake in the press is washed with 400 liters of water and 425 liters of methanol. The filter cake is removed from the press and slurried in 500 liters of methanol containing one percent calcium chloride. After filtration the methanol extract assays 560 mcg. per ml. and contains about twenty percent of the antibiotic originally present in the filter cake. The filter cake is extracted a second time with 400 liters of methanol containing one percent $CaCl_2$ and gives an extract assaying 266 mcg. per ml. A third extraction of the cake is carried out using 400 liters of methanol containing 3340 ml. of concentrated hydrochloric acid. The third methanol extract assays 428 mcg. per ml.

One hundred liters of the first methanol extract is concentrated under vacuum to seventeen liters. The concentrated methanol extract is mixed with two volumes of water and two volumes of n-butanol and adjusted to pH 2.2 with sulfuric acid. The phases are separated by gravity. Approximately ninety percent of the antibiotic is transferred to the butanol. The butanol solution is washed twice with one liter amounts of deionized water. The butanol solution is adjusted to pH 7.1 with ten percent sodium hydroxide and allowed to stand in the cold room for three days. The precipitate which forms is separated by filtration. After drying, a total of 70 grams of the calcium salt assaying 487 mcg./mg. is obtained which represents about a sixty percent recovery of the antibiotic from the methanol extract.

EXAMPLE 10

*Recovery of M-319 Antibiotic as M-319 Acid*

The whole culture, 29,200 liters, produced as in Example 5 is adjusted to pH 5.3 with sulfuric acid and three percent by weight of a filter aid is added. The slurry is filtered on a plate and frame filter press and the filtrate which assays 7.5 to 11 mcg./mg. is discarded. The filter cakes are washed with water and with 1500 liters of methanol. Both washes are discarded as they contain less than one percent of the antibiotic originally present in the whole culture. The antibiotic is extracted from the filter cake by slurrying in 9600 liters of methanol containing 96 kilograms of calcium chloride. The slurry is agitated for 18 hours and filtered on a plate and frame filter press. The extract assays 760 mcg./ml. and contains about 59 percent of the antibiotic originally present in the whole culture. The methanol extract is concentrated to 550 liters in vacuo, mixed with 520 liters of n-butanol, 550 liters of deionized water, and adjusted to pH 0.9 with sulfuric acid. Twenty pounds of a filter aid is added to the mixture. The mixture is filtered, the filter cake washed with a small amount of n-butanol, and the phases of the filtrate separated by centrifugation. The n-butanol extract assays 6,650 mcg./ml. and contains about 32 percent of the antibiotic originally present in the whole culture. The extract is washed by mixing with 190 liters of deionized water and centrifugation to separate the phases. The 580 liters of washed extract contains about 24 percent of the antibiotic originally present in the whole culture. The n-butanol extract is again mixed with 190 liters of deionized water and adjusted to pH 9.8 with a 25 percent sodium hydroxide solution. The phases are separated by centrifugation. The organic phase is re-extracted in a similar manner with 100 liters of deionized water. The aqueous phases are adjusted to pH 1.5 with sulfuric acid and cooled at 5° C. for 48 hours.

The amorphous M-319 acid is collected by vacuum filtration, washed with a small volume of ethyl acetate, and dried in vacuo at room temperature. The product weighs 7.97 kilograms, contains 3.64 billion units of M-319 antibiotic and represents a yield of 21.6 percent from whole culture.

EXAMPLE 11

*Recovery of Antibiotic M-319 as Calcium Salt and Conversion to Acid*

The whole culture 24,200 liters produced as in Example 5 is adjusted to pH 5.3 with concentrated sulfuric acid and four percent by weight of a filter aid is added. The slurry is filtered with a plate and frame filter press. The filtrates which assay 5–11 mcg./ml. are discarded. The filter cakes are washed with water and then with methanol. The activity is eluted from the filter cakes by extraction with 12,000 liters of methanol containing one percent calcium chloride. The extract assays 362 mcg./ml. and contains about thirty-nine percent of the antibiotic originally present in the whole culture. The filter cake is re-extracted with 7900 liters of methanol containing one percent calcium chloride. The extract assays 487 mcg./ml. and contains an additional thirty-one percent of the antibiotic originally present in the whole culture.

The first extract is concentrated under vacuum to about one-tenth volume. The concentrated methanol is mixed with two volumes of deionized water, two volumes of n-butanol, and is adjusted to pH 2.1 with a saturated aqueous sulfamic acid solution. The phases are separated by centrifugation. Approximately seventy-six percent of the antibiotic is transferred to the n-butanol. The butanol solution is adjusted to pH 7.5 with a twenty-five percent sodium hydroxide solution. The mixture is cooled at 10° C. for fifteen hours and the calcium salts are collected by centrifugation.

The second extract is concentrated and treated in the same proportional manner. The wet salts are combined, slurried in 337 liters of methanol and adjusted to pH 0.3 with sulfuric acid. The slurry is filtered on a plate and frame filter press. The filtrate is mixed with four volumes of deionized water and cooled for 18 hours at 10° C. The M-319 acid is collected by filtration and the precipitate washed with a small amount of deionized water. The acid is dried in vacuo at 32° C. for 48 hours. The amorphous M-319 acid assays 496 mcg./mg. and weighs 5.91 kilograms with a twenty-six percent recovery from whole culture.

EXAMPLE 12

*Crystallization of M-319 Calcium Chloride Complex*

One kilogram of M-319 acid, as produced in Example 10 is converted to calcium chloride complex by slurrying in 7.5 liters of methanol containing 75 grams of calcium chloride. The liquors are separated from the undissolved solids by the addition of 300 grams of a filter aid and vacuum filtration of the slurry. The filter cake is washed with an additional two liters of methanol. The filtrate and wash are combined. Three and one-half volumes of ethyl acetate are added and the mixture is cooled at 5° C. with slow agitation for 18 hours. The crystals are collected by vacuum filtration, washed with a small volume of ethyl acetate and dried in vacuo at room temperature. The calcium chloride complex assaying 602 mcg./mg. weighs 657 grams and represents 79 percent recovery.

EXAMPLE 13

*Preparation of M-319 Acid (Amorphous)*

655.5 grams of M-319.$CaCl_2$ complex prepared as in Example 12 assaying 602 mcg./mg. is slurried with water and filtered. The wet cake is dissolved in methanol and sulfuric acid. $CaSO_4$ is filtered off and the methanol solution is carbon treated with 6 grams of activated carbon. The M-319 acid is precipitated with two volumes of water.

440 grams of M-319 acid are recovered. This material assays 776 mcg./mg. with a yield of 86.3 percent.

EXAMPLE 14

*Crystallization of M-319 Acid*

Five grams of amorphous M-219 acid as prepared in Example 13 assaying 564 mcg./mg. is dissolved in 100 ml. of methanol containing 1.0 gram of trichloroacetic acid. The solution is seeded with crystalline M-319 acid and 100 ml. of water is added. The product is cooled overnight. The filtered acid is washed with ethyl acetate and mixed hexanes (Skellysolve B) and dried under vacuum to obtain 2 grams of crystalline acid which assays 654 mcg./mg. and has an E value of $$E_{1\ cm.}^{1\%}$$

of 1187 at 275 millimicrons in methanol solution. Calculated for $C_{23}H_{21}NO_7 \cdot H_2O$: C=62.6%; H=5.2%; N=3.18%; O=29.0%. Found: C=62.32%; H=5.36%; N=3.06%; O=28.74%.

EXAMPLE 15

*Preparation of M-319 Hydrochloride From M-319 Acid*

Ten grams of M-319 acid, obtained as described in Example 13 are slurried in 350 ml. of equal volumes of 6 N hydrochloric acid and isopropanol. The slurry is agitated for two hours. The liquors are separated from the undissolved solids by vacuum filtration. The filtrate is evaporated slowly at room temperature to about 290 ml. and cooled at 5° C. for 48 hours. The crystalline product is collected by vacuum filtation and dried in vacuo at 35° C. for 18 hours. Four grams of M-319.HCl assaying 700 mcg./mg. is recovered with a 49 percent yield which analyzes as follows: Calcd. for $$C_{23}H_{21}NO_7 \cdot H_2O \cdot HCl$$

C=57.8%; H=5.0%; N=2.9%; Cl=7.3%; O=26.8%. Found: C=57.88%; H=5.28%; N=3.60%; Cl=7.39%; O=25.35%.

EXAMPLE 16

*Preparation of (M-319)$_4 \cdot$CaCl$_2$ Complex*

Fifty grams of M-319 calcium chloride complex as prepared in Example 12 is slurried with 500 ml. of methanol containing 15.0 grams of CaCl$_2$. The solids are filtered off and dissolved in 500 ml. of dimethylformamide. Two hundred ml. of water and two ml. of concentrated HCl are added to the filtrate. The solution is seeded and cooled for 18 hours. The crystalline material is filtered off, washed with 50-50 dimethylformamide plus H$_2$O and methyl ethyl ketone. The product is dried under vacuum at room temperature to obtain 13 grams of crystalline material which assays 740 mcg./mg. and ha an E value of $$E_{1\ cm.}^{1\%}$$

of 965 at 275 millimicrons in methanol solution. Calcalculated for $(C_{23}H_{23}NO_8)_4 \cdot CaCl_2$: C=59.00%; H=4.90%; O=27.30%; Ca=2.10%; Cl=3.80%. Found: C=58.63%; H=4.86%; N=2.99%; O=29.54%; Ca=2.29%; Cl=3.69%.

EXAMPLE 17

*Preparation of M-319 Hydrochloride From M-319 Calcium Chloride Complex*

A portion of recrystallized M-319 calcium chloride complex as prepared in the previous example was dissolved in two liters of acetone and 120 ml. of concentrated hydrochloric acid. The resulting solution was filtered and the filtrate seeded. Upon cooling overnight, crystalline M-319 hydrochloride precipitated and was isolated by filtration. Calculated for $C_{23}H_{21}NO_7HCl$: C=60.00%; H=4.80%; N=3.05%; O=24.40%; Cl=7.70%. Found: C=59.73%; H=4.97%; N=3.16%; O=24.02%; Cl=8.16%.

M-319 hydrochloride decomposes at 220°-230° C., has an optical rotation of $\alpha_D^{22}=+570°$ when dissolved in methanol in a concentration of 1% and when titrated in 75% methanol-water has pKa values of 3.4, 7.6 and 9.25. The equivalent weight is 460. A 0.01 N methanolic HCl solution shows absorption maxima in the ultraviolet region of 760 at 224 millimicrons, 1150 at 275 millimicrons and 190 at 435 millimicrons; minima of 330 at 240 millimicrons and 13 at 345 millimicrons with an inflexion of 173 at 310 millimicrons.

The X-ray diffraction pattern for crystalline M-319 hydrochloride was obtained on photographic film using nickel filtered CuKα radiation (λ=1.5418 A.) with a standard General Electric powder camera of 7.6 cm. radius which perimtted detection of d-spacings up to 20 A. The relative intensities of the diffraction lines were estimated visually with the following results:

| d-spacing in Angstroms | Estimated Relative Intensity | d-spacing in Angstroms | Estimated Relative Intensity |
|---|---|---|---|
| 10.8 | 10 | 4.0 | 3 |
| 8.5 | 4 | 3.65 | 2 |
| 7.5 | 8 | 3.50 | 3 |
| 6.5 | 6 | 3.30 | 2 |
| 5.1 | 2 | | |

In a similar manner, the X-ray diffraction pattern for M-319 calcium chloride complex gave the following results:

| d-spacing in Angstroms | Estimated Relative Intensity | d-spacing in Angstroms | Estimated Relative Intensity |
|---|---|---|---|
| 11.0 | 7 | 4.05 | 1 |
| 9.0 | 10 | 3.58 | 8 |
| 6.0 | 2 | 3.40 | 3 |
| 4.45 | 2 | 2.84 | 3 |

The X-ray diffraction pattern for M-319 in its free acid form which does not melt but begins to turn brown at 210° C. and is completely brown at 240° C. was as follows:

| d-spacing in Angstroms | Estimated Relative Intensity | d-spacing in Angstroms | Estimated Relative Intensity |
|---|---|---|---|
| 15.0 | 9 | 3.95 | 5 |
| 13.2 | 2 | 3.75 | *4 |
| 10.7 | 2 | 3.53 | 4 |
| 9.0 | 1 | 3.37 | 1 |
| 8.2 | 10 | 3.26 | 1 |
| 7.4 | 4 | 3.09 | 2 |
| 6.7 | 4 | 2.94 | 1 |
| 6.2 | 8 | 2.74 | 1 |
| 5.8 | 1 | 2.60 | 1 |
| 5.6 | 1 | 2.52 | 1 |
| 5.4 | 1 | 2.40 | 1 |
| 5.02 | 3 | 2.33 | 1 |
| 4.55 | 1 | 2.12 | 1 |
| 4.26 | 8 | 2.04 | 1 |

*Broad.

M-319 calcium salt gave the following X-ray diffraction pattern:

| d-spacing in Angstroms | Estimated Relative Intensity | d-spacing in Angstroms | Estimated Relative Intensity |
|---|---|---|---|
| 11.2 | 10 | 3.5 | *5 |
| 8.3 | 8 | 3.39 | 4 |
| 7.6 | 3 | 3.25 | 2 |
| 6.25 | 4 | 3.02 | *3 |
| 5.6 | 2 | 2.75 | 2 |
| 4.9 | *4 | 2.50 | 1 |
| 4.55 | 1 | 2.36 | 1 |
| 4.3 | 1 | 2.16 | 1 |
| 4.05 | 4 | 1.99 | 1 |
| 3.72 | 2 | | |

*Broad.

When an infrared spectrum of M-319 as the crystalline hydrochloride is run as a suspension in mineral oil using a double beam spectrophotometer, the following absorption bands are seen:

| Wave Length in Microns | Frequency in Reciprocal Centimeters | Intensity |
|---|---|---|
| 2.95 | 3,399 | M |
| 3.85 | 2,597 | W |
| 5.94 | 1,684 | M |
| 6.16 | 1,623 | S |
| 6.25 | 1,600 | W |
| 6.35 | 1,575 | W |
| 6.62 | 1,511 | M |
| 7.14 | 1,401 | W |
| 7.62 | 1,312 | S |
| 8.07 | 1,240 | S |
| 8.60 | 1,163 | W |
| 8.84 | 1,131 | M |
| 9.05 | 1,105 | W |
| 9.21 | 1,056 | M |
| 9.62 | 1,039 | W |
| 9.95 | 1,005 | M |
| 10.10 | 990 | W |
| 10.32 | 969 | W |
| 10.68 | 936 | W |
| 11.01 | 903 | W |
| 11.23 | 891 | W |
| 11.34 | 882 | W |
| 12.13 | 824 | W |
| 12.34 | 810 | M |
| 12.61 | 793 | M |
| 13.02 | 768 | W |
| 13.22 | 757 | W |
| 14.10 | 709 | W |

S=Strong. M=Medium. W=Weak.

The complete infrared absorption spectrum of M-319 hydrochloride is shown in the accompanying drawing.

M-319 in its free acid form or as its hydrochloride, calcium salt or calcium chloride complex possesses a broad antibacterial spectrum as shown in the following table:

| Organism | Minimum Inhibitory Concentration in mcg./ml. | |
|---|---|---|
| | 24 hours | 48 hours |
| Actinomyces bovis | 0.56 | 0.56 |
| Aerobacter aerogenes | 6.1 | 12.3 |
| Aspergillus niger* | | >200 |
| Bacillus subtilis | 12.3 | 12.3 |
| Candida albicans | | >256 |
| Chaetomium globosum* | | >200 |
| Clostridium perfringens | 9 | 9 |
| Clostridium sporogenes | 4.9 | 6.7 |
| Corynebacterium sp. | 1.5 | 3.1 |
| Diplococcus pneumoniae | 12.3 | 12.3 |
| Escherichia coli 6880 | 1.5 | 3.1 |
| Escherichia coli Juhl | 19.1 | 38.3 |
| Escherichia coli Behrens | 0.77 | 3.1 |
| Klebsiella pneumoniae | 0.6 | 1.1 |
| Lactobacillus casei | 1.1 | 2.2 |
| Pasteurella multocida T | 0.14 | 0.28 |
| Pasteurella multocida 10544 | 0.07 | 0.28 |
| Proteus mirabilis | 1.5 | 36.8 |
| Proteus morganii | 1.5 | 3.1 |
| Proteus rettgeri Booth | 1.5 | 3.1 |
| Proteus rettgeri Hambrook | 6.1 | 24.5 |
| Proteus vulgaris JJ | 1.5 | 1.5 |
| Proteus vulgaris 6897 | 0.77 | 1.5 |
| Pseudomonas aeruginosa | 49 | 196 |
| Neisseria catarrhalis | 0.38 | 0.77 |
| Saccharomyces cerevisiae | | >256 |
| Salmonella enteritidis | 1.5 | 1.5 |
| Salmonella typhimurium | 1.5 | 3.1 |
| Sarcina lutea | 0.77 | 1.5 |
| Shigella sonnei | 1.5 | 3.1 |
| Staphylococcus epidermidis | 3.1 | 6.1 |
| Staphylococcus aureus 209P | 6.1 | 6.1 |
| Staphylococcus aureus Wise 391 | 3.1 | 6.1 |
| Staphylococcus aureus Treaster | 3.1 | 6.1 |
| Streptococcus faecalis | 6.1 | 18.4 |
| Streptococcus pyogenes | 1.5 | 6.1 |
| Trichophyton mentagrophytes* | | >200 |
| Vibrio fetus | | 1.3 |

*Incubated for more than 48 hours.

M-319 as the free acid shows weak acidic properties and very weak basic properties. It is soluble in sodium hydroxide but decomposes. It is not soluble in dilute acids and the basic property is not apparent in water. It gives a positive test for the phenolic group and readily forms complexes with calcium chloride. Furthermore, M-319 per se as well as its hydrochloride, calcium salt and calcium chloride complex are insoluble in water. The calcium chloride complex, however, is very soluble in methanol and can be readily converted to the free acid with sulfuric acid and the free acid thereafter extracted with butanol.

In addition to being useful for the control of the growth of a host of bacterial organisms, M-319 in the form of its free acid, hydrochloride, calcium salt or calcium chloride complex is valuable in preventing sinusitis in turkeys. In respresentative operations, from 50 to 100 mg. of M-319 as an aqueous suspension was introduced directly into each of the swollen sinuses of turkeys previously inoculated with an infectious strain of the causative agent of sinusitis resulting in 40 to 60% total cures and reduced swelling in the sinuses of all birds.

What is claimed is:

1. A method of producing antibiotic M-319 which comprises cultivating the organism *Nocardia sulphurea* under submerged aerobic conditions in a culture medium containing assimilable sources of carbohydrates, organic nitrogen and inorganic salts until substantial antibiotic activity is produced by said organism and recovering antibiotic M-319 from said culture medium.

2. A method as claimed in claim 1 in which the organism employed is *Nocardia sulphurea* NRRL 2822.

3. A method as claimed in claim 2 in which the culture medium is maintained at a temperature of from 24°–32° C. for a period of from 2 to 10 days.

4. A method as claimed in claim 2 which includes the steps of clarifying the culture medium, adsorbing antibiotic M-319 therefrom with a solid adsorbent and eluting the adsorbate.

5. An antibiotic substance designated as M-319 hydrochloride having the following properties: Insoluble in water; an empirical formula of $C_{23}H_{21}NO_7 \cdot HCl$; an elemental analysis of 59.73% carbon, 4.97% hydrogen, 3.16% nitrogen, 24.02% oxygen and 8.16% chlorine; an equivalent weight of 460; decomposes at 220°–230° C.; an optical rotation $\alpha_D^{22}$ of +570° in methanol; pKa values of 3.4, 7.6 and 9.25 when titrated in a 75% methanol-water mixture; an ultraviolet absorption spectrum in 0.01 N methanolic HCl exhibiting maxima of $$E_{1\,cm.}^{1\%} = 760$$

at 224 millimicrons, 1150 at 275 millimicrons and 190 at 435 millimicrons with minima of 330 at 240 millimicrons and 13 at 345 millimicrons; has X-ray diffraction lines of $d = 10.8$, 8.5, 7.5, 6.5, 5.1, 4.0, 3.65, 3.50 and 3.30 and an infrared absorption spectrum when suspended in hydrocarbon oil in solid form as shown in the drawing.

6. The product produced by the method of claim 1.

No references cited.